United States Patent
Jayakumar et al.

(12) 
(10) Patent No.: US 11,379,215 B1
(45) Date of Patent: Jul. 5, 2022

(54) APPLICATION-UPDATE TECHNIQUES

(71) Applicant: Amazon Technologies, Inc., Seattle, WA (US)

(72) Inventors: Jayasim Jayakumar, Bangalore (IN); Anmol Dalmia, Sambalpur (IN); Naveen Thontepu, Visakhapatnam (IN); Anish Kumar Gupta, Bharatpur (IN); Piyush Jain, Irvine, CA (US); Cristian Sanchez, Aliso Viejo, CA (US); Michael Richardson, Dana Point, CA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 16/901,424

(22) Filed: Jun. 15, 2020

(51) Int. Cl.
G06F 8/656 (2018.01)
G06F 8/658 (2018.01)
H04L 9/32 (2006.01)

(52) U.S. Cl.
CPC .............. G06F 8/658 (2018.02); G06F 8/656 (2018.02); H04L 9/3265 (2013.01)

(58) Field of Classification Search
CPC ......... G06F 8/656; G06F 8/658; H04L 9/3265
USPC ........................................................ 717/172
See application file for complete search history.

(56) References Cited

U.S. PATENT DOCUMENTS

| | | | |
|---|---|---|---|
| 2003/0177485 A1* | 9/2003 | Waldin, Jr. et al. .... | G06F 8/658 717/172 |
| 2005/0132382 A1* | 6/2005 | McGuire et al. ....... | G06F 8/658 719/311 |
| 2015/0347121 A1* | 12/2015 | Harumoto ................. | G06F 8/65 717/172 |
| 2020/0311274 A1* | 10/2020 | Cooke ..................... | G06F 8/658 |
| 2020/0371777 A1* | 11/2020 | Zhang et al. .......... | G06F 8/658 |

* cited by examiner

*Primary Examiner* — Wei Y Zhen
*Assistant Examiner* — Mohammed N Huda
(74) *Attorney, Agent, or Firm* — Lee & Hayes, P.C.

(57) ABSTRACT

This disclosure describes, in part, techniques and systems for accurately and efficiently updating applications stored on client computing devices. In some instances, the systems and techniques receive an update from an application developer, but rather than send the update directly to a client computing device that operates the application, the systems and techniques determine one or more difference between the current update and an update previously sent to the client computing device and, thereafter, send a "diff file" indicative of these differences to the client computing device. The client computing device may then use the diff file and the previously received update to re-create the new update. Thus, the systems and techniques are able to update client computing devices while limiting the amount of data sent over a network to these devices.

22 Claims, 9 Drawing Sheets

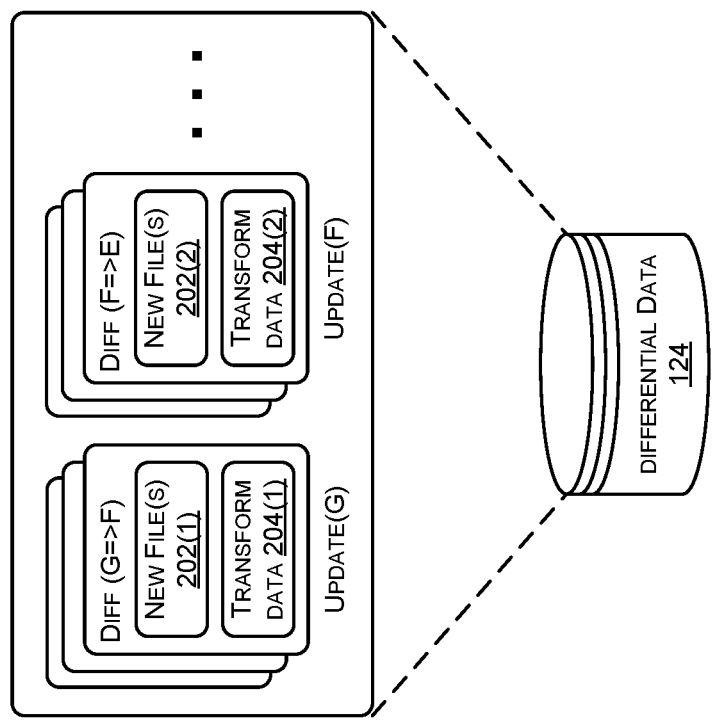
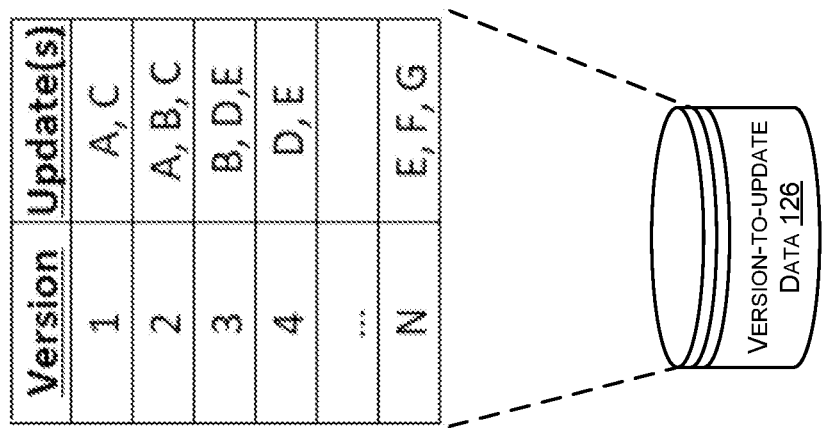
FIG. 2

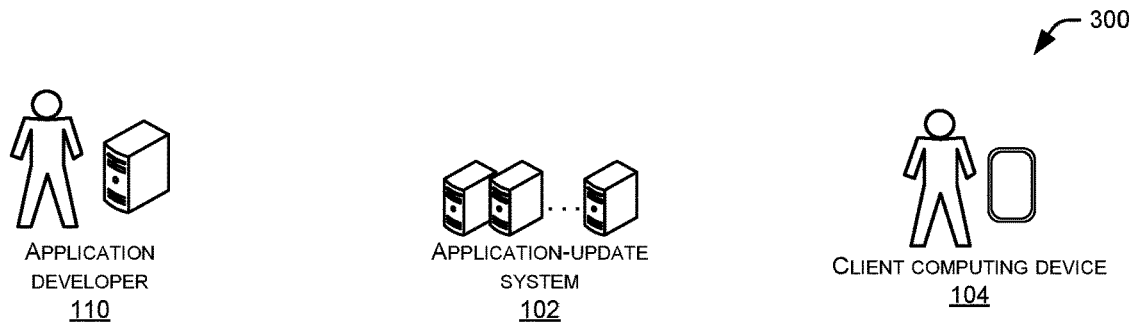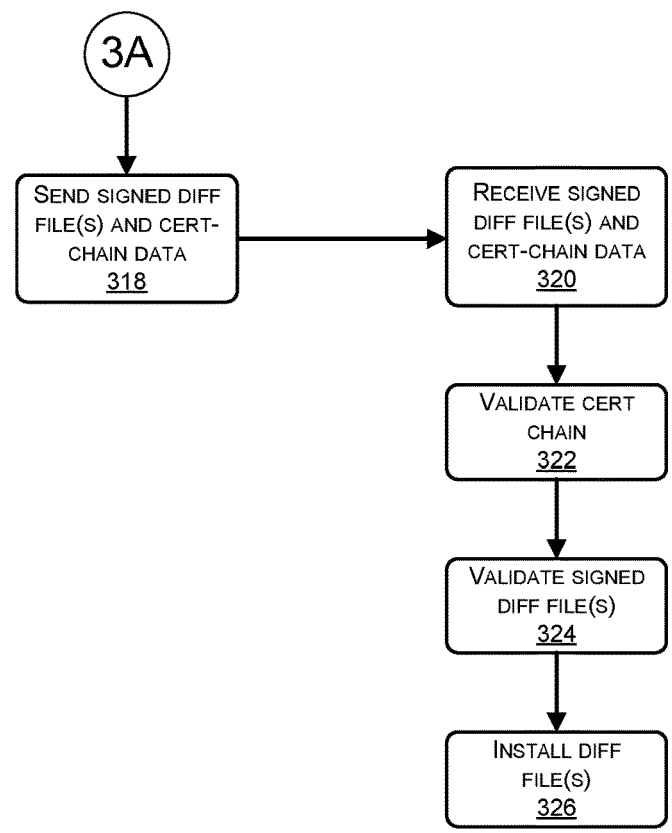
FIG. 3B

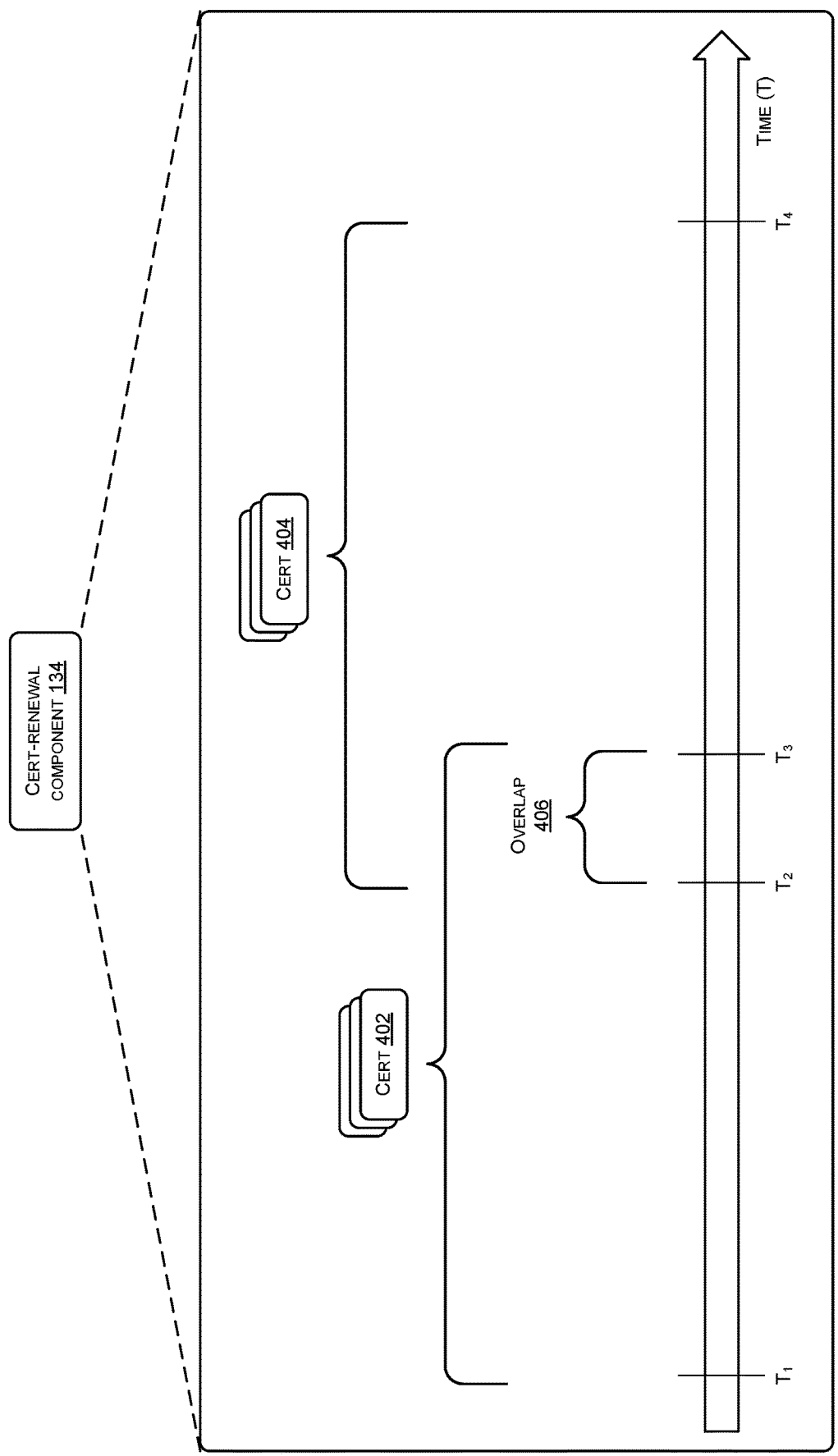

APPLICATION-UPDATE TECHNIQUES

BACKGROUND

As use of client computing devices continues to proliferate, so too does the use of applications on these devices. For example, users increasingly use computing applications for communication, shopping, games, productivity, and the like. In addition, these applications often evolve over time, as developers add features, fix bugs, and the like. Thus, the developers often create application updates for provisioning to the appropriate client computing devices. However, given the large number of applications and, thus the large number of updates that occur at any given time, the process of accurately and efficiently providing such updates can be onerous.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates an example datastore that stores information regarding which versions of a particular application have received which previous updates to the application, which the application-update system may use for determining which diff files to generate. This figure also illustrates a datastore that stores the diff files as "differential data".

FIGS. 3A-B collectively illustrate an example sequence of operations that may occur in the environment of FIG. 1 for receiving update data from a developer and an indication of which version(s) of an application the update data applies to, determining which diff files to generate based on the indicated version(s), generating the diff files, receiving a request for an application update, and, in response to receiving the request, sending the appropriate diff file(s) to the requesting computing device.

FIG. 4 illustrates a first time range during which a first certificate chain is valid and a second time range during which a second certificate chain is valid. The application-update system may use one or both these certificate chains to cryptographically sign diff files sent to a client computing device such that the client computing device is able to verify the authenticity of the diff file. In some instances, the time during which these certificate chains are valid may overlap with one another to allow the application-update system to renew the certificate chains without interrupting operation of the system.

DETAILED DESCRIPTION

Figure 1:
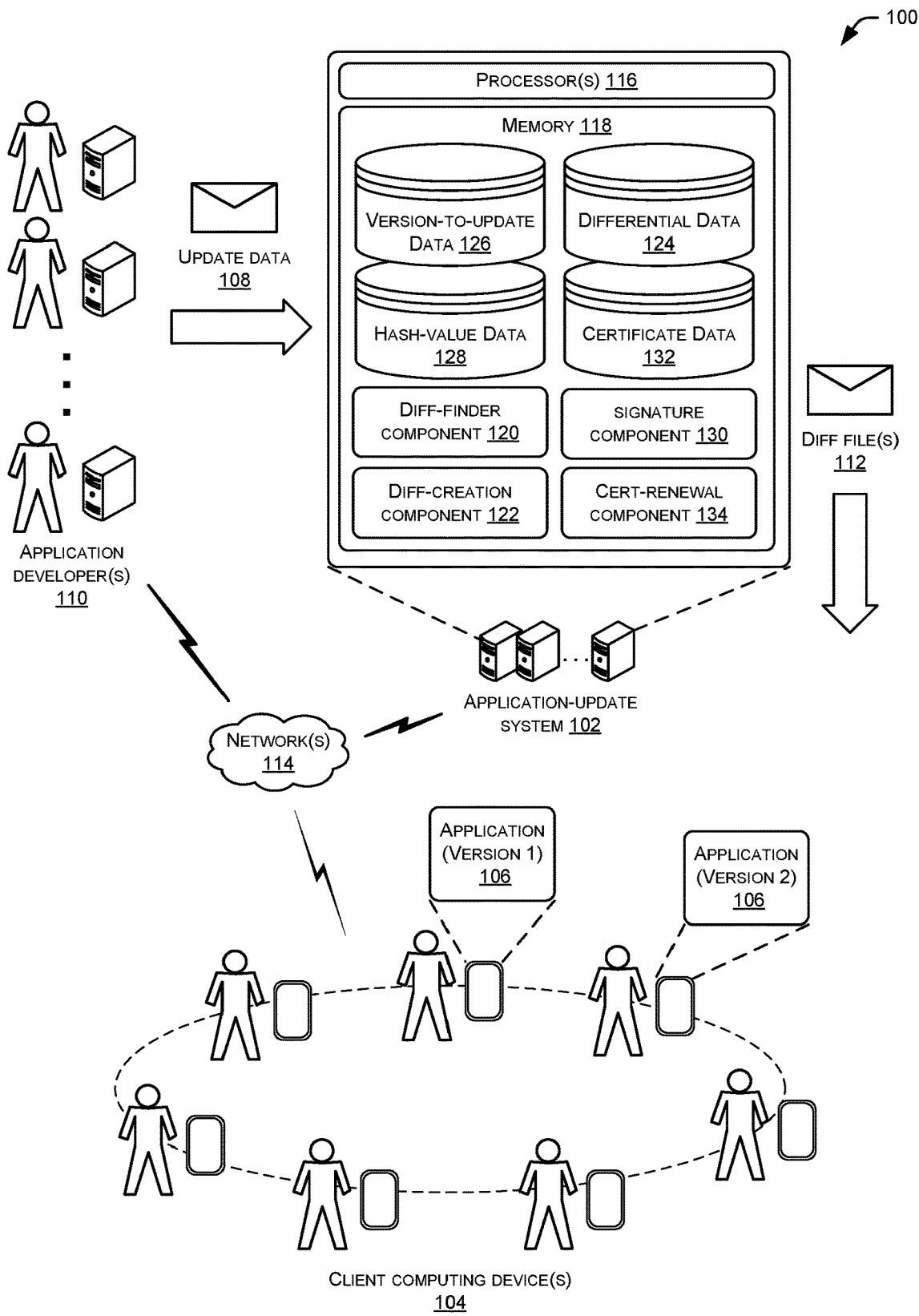
FIG. 1 illustrates a schematic diagram of an illustrative environment in which an application-update system receives application-update data from application developers and, in response, accurately and efficiently updates data on client computing devices operating the applications. For example, upon receiving update data for a particular application, the application-update system may determine a previous update that a client computing device has received for the application and may determine one or more differences between the current update and the previous update. After doing so, the system may generate and send a "diff file" that includes any new files in the new update (relative to the previous update) and instructions for how to use the new file and files already stored on the client device for generating the new update on the client computing device, thus minimizing the amount of data sent over the network from the system to the client computing device.

This disclosure describes, in part, techniques and systems for accurately and efficiently updating applications stored on client computing devices. In some instances, the systems and techniques receive an update from an application developer, but rather than sending the update directly to a client computing device that operates the application, the systems and techniques determine one or more difference between the current update and an update previously sent to the client computing device and, thereafter, send a "diff file" indicative of these differences to the client computing device. The client computing device may then use the diff file and the previously received update to re-create the new update. Thus, the systems and techniques are able to update client computing devices while limiting the amount of data sent over a network to these devices.

In some instances described below, an application-update system communicates with computing devices of application developers for receiving application updates, and also communicates with client computing devices for updating applications stored on these client devices. An example application developer may provide an update to an application to the application-update system in the form of update data. In addition, the application developer may specify which version (or versions) of the application the update data is to be applied to. For example, the application developer may indicate that the update data is to be applied to a particular version of an application (e.g., "version 2.2"), to a range of versions (e.g., "versions 1 to 4"), to versions that are equal to or greater to a particular version number (e.g., "version 2.5 and beyond"), or the like.

Upon receiving the update data and the indication of the version(s) to which the update data is to apply, the application-update system may generate one or more diff files for sending to client computing devices to enable these devices to update their respective instances of the application stored on their respective devices. In some instances, and as described in detail below, a diff file may comprise any files that are new to the version of the application stored on a particular client computing device, as well as one or more instructions for using the new files and/or additional files already residing on the client computing device to generate the update data provided to the application-update system by the application developer. Thus, upon receiving a diff file, a client computing device may use the diff file to update its instance of the application in the manner desired by the developer of the application.

Prior to generating these diff files, however, the application-update system may initially determine which diff files to generate. To do so, the application may store previous updates to the application that each version of the application has received. For example, the application-update system may store an indication that a first version of an application has previously received updates "A" and "B", a second version of the application has previously received updates "B" and "C", and a third version of the application has previously received update "D". In this example, envision that the current update data received from the developer corresponds to an update "E".

Further, the application-update system may use the indication of which version(s) of the application are to receive the update in order to determine the diff files to generate. For instance, envision that in this example the application developer indicates that the update is to apply to versions of the application greater than version two. Thus, the application-update system may determine that the update is to apply to versions two and three. Further, the application-update system may determine that version two of the application has previously received updates "B" and "C", while version three of the application has previously received update "D". Thus, the application-update system may determine to generate the diff files: a diff file between update E and update B, a diff file between update E and update C, and a diff file between update E and update D.

After determining to generate these three diff files, the application update system may generate these files serially, in parallel, and/or in any other manner. In order to do so, the application-update system may analyze the new update ("E") with each determined update ("B,", "C", and "D"). For example, the application-update system may compare update "E" with update "B", update "E" with update "C", and update "E" with update "D". In some instances, the application-update system may compare these updates to determine at least: (1) any new files that are present in the new update but not in the previous update; (2) any deleted files that are present in the previous update but not in the new update, and (3) any files that are present in both updates but may have moved locations from a first location in the previous update to a second location in the new update and/or may have been duplicated and, thus, are present at multiple locations in the new update.

In one example, the application-update system stores a hash value for each file in each update and may compare these hash value to respective hash values of the new update to identify the new, deleted, and moved files. For example, envision that previous update "B" included the following four files along with the location of each file:

File_1
File_2
File_3
File_4

The application-update system may thus store the following hash values for the update "B":

HV(File_1)
HV(File_2)
HV(File_3)
HV(File_4)

In addition, envision that the new update "E" includes the following four files:

File_1
File_3
File_4
File_5

The application-update system may thus compute and store the following hash values for the update "E":

HV(File_1)
HV(File_3)
HV(File_4)
HV(File_5)

After computing these hash values, the application-update system may compare each hash value from the new update "E" to one or more hash values for the update "B" to determine whether the corresponding file is present in update "B" or whether the corresponding file is new to the update "E". The application-update system may also compare each hash value from the previous update "B" to one or more hash values from the new update "E" to determine if the corresponding file has been deleted. In this example, the application-update system may determine that "File_5" has been added to the update "E" and, thus, is a new file, while "File_2" is not included in the update "E" and, thus, is a deleted file.

In addition to determining which files have been added and/or removed from the current update, the application-update system may determine any of the files that are common in both updates have been moved and/or have been duplicated to new locations in the new update. For example, the application-update system may determine that "File_3" (which is present in both updates) has moved from a first location in the previous update to a second location in the new update. Further, the application-update system may determine that "File_4" is still in the same location, but is also present in a new location in the new update.

After identifying each new file, each deleted file, and each moved file (and the location of these moved filed), the application-update system may generate a corresponding diff file. The diff file may comprise the new file(s) and transform data that comprises one or more instructions for creating the new update "E" using the new file(s) and the previous update "B". For example, the instructions may include instructions to delete one or more specified file(s) and/or instructions to move and/or duplicate one or more specified files. In some instances, the size of the diff file is significantly smaller than the entire update "E", given that the corresponding diff files is free from (i.e., does not include) any files that are common between the two updates "E" and "B".

After, before, or during the generating of the first diff file between update "E" and update "B", in this example the application-update system may generate a second diff file between update "E" and update "C" and a third diff file between update "E" and update "D". The application-update system may then store these diff files for distribution to client computing devices now or at a later time.

In some instances, the application-update system may send the diff files to the client computing devices in response to receiving update requests from the devices. For example, envision that a particular client computing device storing the application sends a request for an update to the application to the application-update system. In some instances, this request may be accompanied by an indication of the version of the application that the client computing device is running and/or an indication of the current update that the instance of the application is utilizing. In this example, envision that the client computing device sends a request for an update to the application and an indication that the device is operating update "B".

In response to receiving this request and the indication of the update being operated, the application-update system may determine the appropriate diff file to send (in this example, the diff file representing differences between update "E" and update "B") and may send this diff file to the client computing device. Because the diff file only includes the new file(s) and instructions for moving and/or deleting other existing files, the diff file may be smaller than the update data corresponding to update "E". Thus, the amount of network bandwidth used to send the diff file (and, hence, the bandwidth used to update the client computing device) may be significantly lessened. This savings of network bandwidth may increase with the number of client computing devices requesting updates to the application or to other applications stored on these devices. In addition, these diff files may be compressed before sending to further reduce the size of the package being delivered.

Upon receiving the diff file in this example, the client computing device may utilize the instructions and the new file(s) to update the application. In one example, the instructions first cause the client computing device to copy the contents of the existing update ("B") into a new folder and proceed to delete the files that are not present in the new update ("E"). In this example, the client computing device may delete "File_2" from the new folder. Thereafter, the client computing device may move and/or duplicate any moved files to the new locations indicated in the instructions. In addition, the client computing device may copy the new files from the diff file into the new folder and may move and/or duplicate these new files into the appropriate locations indicated by the instructions. After doing so, this new folder will be equivalent to the update data corresponding to update "E", as initially provided by the application developer to the application-update system.

In some instances, the application-update system may cryptographically sign the diff files prior to sending the diff files to the requesting client computing devices to enable these devices to verify the authenticity of the received diff files. For example, the application-update system (or another system) may maintain one or more certificate chains and may use a certificate from this chain to sign each diff file prior to sending the diff file to a client device. For example, the application-update system may sign the diff files using a private key of the certificate from the certificate chain and may send the signed diff file to the client device.

In these instances, in addition to sending the signed diff file, the application-update system may also send certificate-chain data to enable to the receiving client computing device to verify the authenticity of the received diff file. This certificate-chain data may comprise the certificate chain itself or may comprise information (e.g., a URL) to enable the client computing device to obtain the certificate chain. It is similarly noted that while the above discussion describes sending the signed diff file to the client computing device, in other instances the application-update system may send data (e.g., a URL) for obtaining the signed diff file.

After receiving the certificate chain (either directly from the application-update system or after fetching the certificate chain), the client computing device may first authenticate the certificate chain. For example, the client computing device may plug in the certificate chain into a root certificate stored on the client computing device. If the client computing device verifies the certificate chain, then the client computing device may use the public key of the certificate (e.g., the last certificate on the chain) to verify the signature of the signed diffed file. That is, the client computing device may use the public key corresponding to the private key of the certificate used by the application-update system to sign the diff file in order to verify this signature. If the client computing device verifies the signature, then the device may proceed to install the diff file as noted above. If the device, however, fails to verify the authenticity of the certificate chain or the signature, then the client computing device may refrain from installing the diff file and/or may refrain from even committing the diff file to memory of the client computing device, given that the diff file has not been deemed trustworthy.

In some instances, the application-update system may periodically renew the certificate chains in order to increase security of the system. That is, by renewing these certificate chains, the system becomes more difficult for an attacker to compromise. That is, by renewing certificate chains, the system requires that an attacker attempt to compromise the new certificate chain, and that the attacker's attempts to compromise any now-expired certificate chains are now obsolete. However, updating certificates may, in some instances, interrupt operation of the application-update system itself.

Therefore, this disclosure also describes systems and techniques for enabling periodic and automatic renewal of security credentials (e.g., certificate chains) in a manner that does not interrupt operation of the updating processes of the application-update system. In order to achieve this, the application-update system described herein may define, for a particular certificate chain, a time range during which the certificate chain is valid. Thus, when a client computing device attempts to verify a diff file using a public key associated with this certificate chain within this time range, the signature will be verified. However, if the device attempts to validate the signature outside of this time range, the signature will not be verified.

In order to lessen the chances that such a validation fails, however, the application-update system may associate certificate chains with valid time ranges that overlap one another. For instance, envision that a first certificate chain is associated with a valid time range between Time_1 and Time_2. Thus, any verifications between Time_1 and Time_2 will succeed, while any verifications after Time_2 will not. However, envision further that the application-update system also generates a certificate chain that is valid between Time_3 (which is prior to Time_2) and Time_4. Further, the application-update system may begin signing diff files using the second certificate chain at or near Time_3. Thus, in the overlapping time between Time_2 and Time_3, verifications that occur using the public key of either the first or second certificate chains will succeed while still enabling the renewing of the certificate chains over time.

In order to perform this renewal process, the application-update system may identify those certificate chains that are associated with an expiry time that is within a threshold amount of time. After identifying these certificate chains, the application-update system may update these certificate chains and, thereafter, re-sign any stored diff files using the new certificate chains. The application-update system may also store an indication of the valid time range associated with each certificate chain such that the verifications can occur successfully within these time ranges.

To provide an example, a certificate chain used to sign diff files may be associated with a valid time range of twelve months. However, a component of the application-update system may periodically analyze a certificate store to identify those certificates that are set to expire within a predetermined amount of time, such as three months. After nine months of use of the example certificate chain, the example component of the system may determine that the certificate chain is set to expire within the threshold amount of time, three months in this example. Thus, the component or another component of the system may obtain a new certificate chain (or a new certificate for generating a new certificate chain), may store the new chain and its keys, and may begin the process of signing stored diff files using these new certificate chain. After completely the signing process, the application-update system may then begin vending the signed diff files using the new certificate chain, while enabling client computing devices to validate diff files that have been signed using either the previous certificate chain or the new certificate chain for the overlapping time period.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative environment 100 in which an application-update system 102 provides data for providing updates to client computing devices 104 that operate client applications 106. In some instances, rather than sending entire update packages to the devices 104, the application-update system 102 determines differences between new updates released by the application developers and updates already existing on these client devices 104 and sends data indicative of these differences in lieu of the entire update.

As illustrated, the application-update system 102 may periodically receive update data 108 from application developers 110, with this update data 108 for updating applications on one or more of the client devices, such as the illustrated application 106. In some instances, the application-update system 102 communicates with numerous different application developers 110 that provide an array of different client applications.

In some instances, upon receiving update data 108, the application-update system may determine differences between the update data and previous updates sent to one or more of the client computing devices 104. The application-update system 102 may then create one or more diff files 112 indicative of these differences for sending to the one or more client devices over a network 114 in lieu of sending the update data 108. Given that different client devices 104 may operate different versions of the same application, however, the application-update system 102 may generate and vend different diff files 112 based on the version and/or update number that a client computing device currently utilizes. For instance, FIG. 1 illustrates that while a first client computing device 104 operates a first version of the application 106, a second client computing device 104 operates a second, different version of the same application 106. Thus, the application-update system may vend a first diff file to the first device and a second, different diff file to the second device, as described in detail below. By sending diff files 112 rather than all of the update data 108, the application-update system 102 minimizes the amount of data sent over the network 114 from the system 102 to the client computing devices 104.

The application-update system 102 may be hosted by one or more network-accessible resources, such as server computing devices. While illustrated as being collocated, it is to be appreciated that these resources may be located across different regions and/or across the globe. Further, the network(s) 114 which connect the system 102 to the developer and client devices may represent an array or wired networks, wireless networks (e.g., WiFi), or combinations thereof. Further, the application-update system 102 may generally refer to a network-accessible system—or "cloud-based system"—implemented as a computing infrastructure of processors, storage, software, data access, and so forth that is maintained and accessible via the network(s) 114, such as the Internet. Cloud-based systems may not require end-user knowledge of the physical location and configuration of the system that delivers the services. The client computing devices described herein, meanwhile, may comprise tablet computing devices, smart televisions (TVs), laptop computer, desktop computers, mobile phones, voice-controlled assistants, display devices, audio devices, gaming devices, and/or the like. The application developers 110 may similarly utilize any type of suitable computing device, including mobile phones, desktop computers, laptop computers, server computers, and/or the like.

As illustrated, the application-update system 102 may include one or more processors 116 and memory 118. The processors 116 may include a central processing unit (CPU) for processing data and computer-readable instructions, and the memory 118 may store computer-readable instructions that are executable on the processor(s) 116. The memory 118 may individually include volatile random access memory (RAM), non-volatile read only memory (ROM), non-volatile magnetoresistive (MRAM) and/or other types of memory.

As illustrated, the memory 118 of the system 102 may store a diff-finder component 120 and a diff-creation component 122. Upon receiving the update data 108, the diff-finder component 120 may determine which diff files to generate. For example, in addition to sending the update data 108, the application developers 110 may send an indication of which version(s) of the corresponding application the developers would like to apply the update data 108 to. The developers may specify a particular version or versions of the application, a range of versions of the application, a minimum version of the application, a maximum version of the application, and/or may specify the version(s) in any other manner.

The diff-finder component 120 may use the specified versions to determine which updates these version(s) have previously received, which in turn may be used to determine which diff files to generate. For example, the memory 118 of the system 102 may also include version-to-update data 126 that maintains a listing of which updates to an application each version of the application has previously received. FIG. 2 illustrates an example of the version-to-update data 126. As illustrated, in this example a first version (1) of the application has received updates "A" and "C", a second version (2) of the application has received updates "A", "B", and "C", a third version (3) of the application has received updates "B", "D", and "E", a fourth version (4) of the application has received updates ""D" and "E" and an $N^{th}$ version (N) of the application has received updates "E", "F", and "G".

Using this information, along with the version(s) to be updated using the update data 108, the diff-finder component 120 may determine which diff files 112 to generate. For example, if the application developer 110 indicates that the update data 108 is to apply to version 1 of the application of the application, then the diff-finder component 120 may determine to generate a diff file between the update data 108 and update "A" and between the update data 108 and update "C". If the application developer 110 indicates that the update data 108 is to apply to version 2 of the application of the application, then the diff-finder component 120 may determine to generate a diff file between the update data 108 and update "A", between the update data 108 and update "B", and between the update data 108 and update "C". Further, and as noted above, in some instances the application developer 110 may indicate that the update data is to be applied to multiple version of the application.

Returning to FIG. 1, after the diff-finder component 120 determines which diff files to generate using the update 108, the diff-creation component 122 may generate these diff files. For instance, the diff-creation component may compare the update data to each of other updates determined by the diff-finder component 120 to generate a corresponding diff file.

Envision, for instance, that the application developer indicates that the update data 108 is to apply to version 4 of the application. Referring to the example of FIG. 2, in this example the diff-finder component 120 may determine that the application-update system 102 is to generate a diff file corresponding to a difference between the update data 108 and update "D" and a diff file corresponding to a difference between the update data 108 and update "E". The diff-creation component 122 may then generate these two diff files as store these files as differential data 124.

In order to generate the first example diff file, the diff-creation component 122 may compare the update data 108 to the update "D" to determine any new files that are in the update data 108 but not in the update "D", any deleted files that are in the update "D" but not in the update data 108, and any files that are in both but have moved locations from the update "D" to the update data 108. After identifying these differences, the diff-creation component 122 may then generate the first diff file, which may comprise any new files and one or more instructions for generating the update data 108 using the new file(s) and the update "D", as described in further detail below.

In one example, the diff-creation component 122 uses hash values of the different files within these different updates to identify these differences. For example, FIG. 1 illustrates that the memory 118 may further store hash-value data 128, which may comprise a hash value associated with each file of each previously received update. For example, envision that the previous update "D" included the following four files along with the location of each file:

File_1
File_2
File_3
File_4

The application-update system 102 may thus compute and store, in the datastore 128, the following hash values for the update "D":

HV(File_1)
HV(File_2)
HV(File_3)
HV(File_4)

In addition, envision that the new update corresponding to the update data 108 includes the following four files:

File_1
File_3
File_4
File_5

The application-update system 102 may thus compute and store, in the datastore 128, the following hash values for the update data 108:

HV(File_1)
HV(File_3)
HV(File_4)
HV(File_5)

After computing these hash values, the diff-creation component 122 may compare each hash value from the update 108 to one or more hash values for the update "D" to determine whether the corresponding file is present in update "D" or whether the corresponding file is new to the update associated with the update data 108. The diff-creation component 122 may also compare each hash value from the previous update "D" to one or more hash values from the update 108 to determine if the corresponding file has been deleted. In this example, the diff-creation component 122 may determine that "File_5" has been added to the update data 108 and, thus, is a new file, while "File_2" is not included in the update data 108 and, thus, is a deleted file.

In addition to determining which files have been added and/or removed from the current update, the diff-creation component 122 may determine any of the files that are common in both updates have been moved and/or have been duplicated to new locations in the new update. For example, the diff-creation component 122 may determine that "File_3" (which is present in both updates) has moved from a first location in the previous update to a second location in the new update. Further, the diff-creation component 122 may determine that "File_4" is still in the same location, but is also present in a new location in the new update.

After identifying each new file, each deleted file, and each moved file (and the location of these moved filed), the diff-creation component 122 may generate a corresponding diff file and may store this diff file in the datastore 124. As FIG. 2 illustrates, each diff file may comprise the new file(s) and transform data that comprises one or more instructions for creating the update data 108 using the new file(s) and the previous update, such as the update "D". For example, the instructions may include instructions to delete one or more specified file(s) and/or instructions to move and/or duplicate one or more specified files. In some instances, the size of the diff file is significantly smaller than the entire update data 108, given that the corresponding diff files is free from (i.e., does not include) any files that are common between the update data 108 and the update "D".

FIG. 2 illustrates that the datastore 124 may store an array of previously computed diff files. For example, FIG. 2 illustrates that the datastore 124 may store one or more diff files associated with an update "G" and one or more prior updates, one or more diff files associated with an update "F" and one or more prior updates, and so forth. For example, FIG. 2 illustrates that the datastore stores a diff file corresponding to differences between the update "G" and the update "F", with this diff file comprising any new files 202(1) that appear in the update "G" but not in the update "F" and transform data 204(1) for generating the update "G" using the new files 202(1) and the files of update "F". Similarly, FIG. 2 illustrates that the datastore 124 includes a diff file corresponding to differences between the update "F" and the update "E", with this diff file comprising any new files 202(2) that appear in the update "F" but not in the update "E" and transform data 204(2) for generating the update "F" using the new files 202(2) and the files of update "E". Of course, while a few example diff files are illustrated, it is to be appreciated more or fewer diff files may be stored.

After generating the first diff file between the update data 108 and update "D", in this example the diff-creation component 122 may proceed to generate a second diff file between the update data 108 and update "E". The diff-creation component 122 may then store this diff file in the datastore 124 as well.

After generating these diff files, a signature component 130 stored in the memory 118 may cryptographically sign each generated diff file prior to or after storing the diff files in the datastore 124. For example, the signature component 130 may sign each diff file using a private key of a certificate from a certificate chain.

At some point thereafter, one or more of the client devices 104 may send a request for an update to the corresponding application to the application-update system 102. For example, envision that a first client computing device 104 operating the fourth version of the application 106 sends a request for an update to application-update system 102. In response to receiving this update request, the application-update system 102 may determine that the client computing device is operating the fourth version and may further determine, from the request, which previous update the application is currently operating. In this example, envision that this client computing device is operating update "D" (rather than update "E"). Thus, the application-update system 102 may obtain, from the datastore 124, the diff file 112 corresponding to differences between the update 108 and the update "D".

After receiving the request for the application update, the application-update system 102 may retrieve the stored signed diff file 112 and may send this file to the client computing device. Upon receiving the signed diff file 112, the client device may first attempt to verify the authenticity of the diff file 112. In these instances, in addition to sending the signed diff file, the application-update system 102 may also send certificate-chain data to enable to the receiving client computing device to verify the authenticity of the received diff file. This certificate-chain data may comprise the certificate chain itself or may comprise information (e.g., a URL) to enable the client computing device to obtain the certificate chain.

After receiving the certificate chain (either directly from the application-update system 102 or after fetching the certificate chain), the client computing device may first authenticate the certificate chain. For example, the client computing device may plug in the certificate chain into a root certificate stored on the client computing device. If the client computing device verifies the certificate chain, then the client computing device may use the public key of the certificate (e.g., the last certificate on the chain) to verify the signature of the signed diffed file 112. That is, the client computing device may use the public key corresponding to the private key of the certificate used by the application-update system to sign the diff file in order to verify this signature. If the client computing device verifies the signature, then the device may proceed to install the diff file 112. If the device, however, fails to verify the authenticity of the certificate chain or the signature, then the client computing device may refrain from installing the diff file 112.

While the above example describes sending a diff file indicating differences between the update data 108 and the update "D" to the client computing device, in other instances the application-update system 102 may send other diff files. For instance, envision that another client computing device operating the fourth version of the application sends a request for an application update, but that in this example the application operating on the device is utilizing update "E". In this example, the application-update system 102 may send a signed diff file 112 corresponding to the differences between the update data 108 and the update "D". Thus, the application-update system 102 enables the appropriate updates to occur on the appropriate client computing devices, while minimizing the amount of network bandwidth used while doing so.

In some instances, a cert-renewal component 134 stored in the memory 118 of the application-update system 112 may periodically renew the certificate chains in order to increase security of the system 102. That is, by renewing these certificate chains, the system 102 becomes more difficult for an attacker to compromise. To do so, the cert-renewal component 134 may define, for a particular certificate chain, a time range during which the certificate chain is valid. Thus, when a client computing device attempts to verify a diff file using a public key associated with this certificate chain within this time range, the signature will be verified. However, if the device attempts to validate the signature outside of this time range, the signature will not be verified.

In order to lessen the chances that such a validation fails, however, the cert-renewal component 134 may associate certificate chains with valid time ranges that overlap one another. For instance, envision that a first certificate chain is associated with a valid time range between Time_1 and Time_2. Thus, any verifications between Time_1 and Time_2 will succeed, while any verifications after Time_2 will not. However, envision further that the cert-renewal component 134 also generates a certificate chain that is valid between Time_3 (which is prior to Time_2) and Time_4. Further, the signature component 130 may begin signing diff files using the second certificate chain at or near Time_3. Thus, in the overlapping time between Time_2 and Time_3, verifications that occur using the public key of either the first or second certificate chains will succeed while still enabling the renewing of the certificate chains over time.

In order to perform this renewal process, the cert-renewal component 134 may identify those certificate chains that are associated with an expiry time that is within a threshold amount of time. After identifying these certificate chains, the cert-renewal component 134 may update these certificate chains and, thereafter, re-sign any stored diff files using the new certificate chains. The cert-renewal component 134 may also store an indication of the valid time range associated with each certificate chain such that the verifications can occur successfully within these time ranges.

To provide an example, a certificate chain used to sign diff files may be associated with a valid time range of twelve months. However, the cert-renewal component 134 may periodically analyze a certificate store to identify those certificates that are set to expire within a predetermined amount of time, such as three months. After nine months of use of the example certificate chain, the cert-renewal component 134 may determine that the certificate chain is set to expire within the threshold amount of time, three months in this example. Thus, the cert-renewal component 134 may obtain a new certificate chain (or a new certificate for generating a new certificate chain), may store the new chain and its keys, and the signature component 130 may begin the process of signing stored diff files using these new certificate chain. After completing the signing process, the application-update system may then begin vending the signed diff files using the new certificate chain, while validating diff files signed using either the previous certificate chain or the new certificate chain for the overlapping time period.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) described herein may possess its own local memory, which also may store program modules, program data, and/or one or more operating systems. The processors(s) described herein may be located in a single device or system, or across disparate devices or systems, which may be owned or operated by various entities.

The memory described herein may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory described herein may be implemented as computer-readable storage media ("CRSM"), which may be any available physical media accessible by the processor(s) described herein to execute instructions stored on the memory described herein. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s) described herein.

Figure 3A:
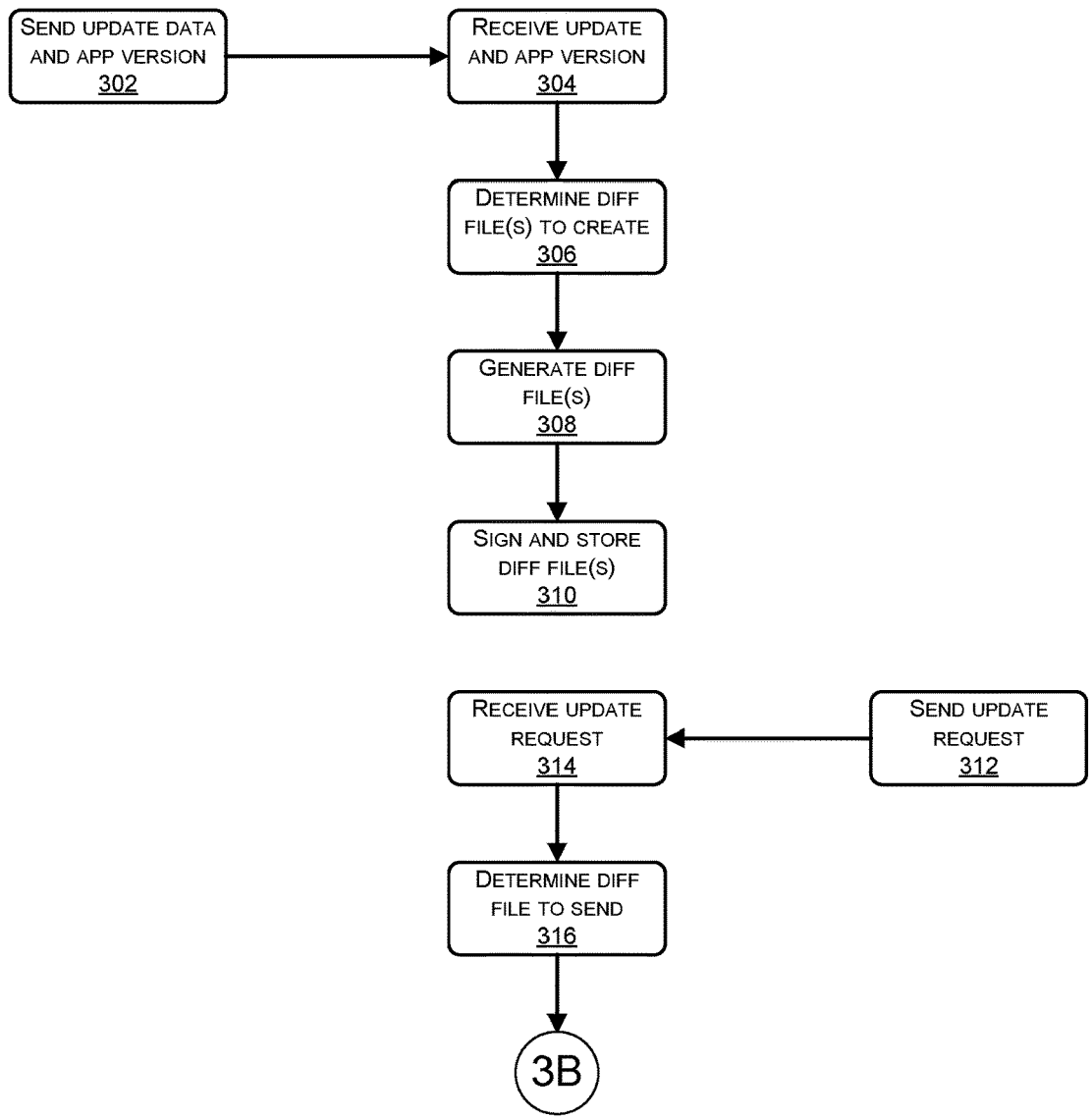

FIGS. 3A-B collectively illustrate an example sequence of operations 300 that may occur in the environment of FIG. 1 for receiving update data from a developer and an indication of which version(s) of an application the update data applies to, determining which diff files to generate based on the indicated version(s), generating the diff files, receiving a request for an application update, and, in response to receiving the request, sending the appropriate diff file(s) to the requesting computing device.

At an operation 302, an example application developer 110 sends update data, and an indication of which versions/update numbers of the application that the update data is to apply to, to the application-update system 102. At an operation 304, the application-update system 102 receives the update data and the indication of the application version and/or update number.

At an operation 306, the application-update system 102 determines one or more diff files to create based on the specified version and/or update number that the update data is to apply to. For example, the application-update system 102 may determine which updates are associated with the specified version and may determine to generate a diff file for each of these update numbers.

At an operation 308, the application-update system 102 generates each diff file. As described above, this may include analyzing the received update data with respective to prior update data. For example, this may include comparing a hash value of each file of the new update data to one or more hash values of one or more files of the prior update data to determine new files, deleted files, moved files, and the like. Further, this operation may include generating the diff file(s) by creating a package that includes any new files and transform data comprising instructions for re-creating the new update data using the new files and the prior update data on the client device. In some instances, if the application-update system 102 does not identify any changes between the current update data and previous update data, the application-update system 102 may refrain from storing the update data and generating any diff files, and may send a corresponding notification to the application developer 110.

An operation 310 represents signing and storing these diff files. For instance, this operation may comprise signing the diff file using a private key associated with a leaf certificate in a certificate chain and storing the signed diff file in a datastore. In some instances, the diff files may be stored prior to being cryptographically signed, in which case the diff file(s) may be signed using the private key in response to receiving a request for an update from a client computing device.

At an operation 312, a client computing device sends a request for an application update to the application-update system 102, which receives the request at an operation 314. At an operation 316, the application-update system 102 determines a diff file to send to the client computing device based on which version of the application client computing device is currently operating as well as which update number the application is currently operating.

FIG. 3B continues the illustration of the process 300 and includes, at an operation 318, the application-update system 102 sending the signed diff file to the client computing device. In addition, the operation 320 may further include sending cert-chain data to the client computing device. This cert-chain data may comprise the certificate chain used to sign the diff file or data to enable the client computing device to retrieve the certificate chain.

An operation 320 represents the client computing device 104 receiving the signed diff file and the cert-chain data. At an operation 322, the client computing device validates the certificate chain by, for example, plugging in the certificate chain to a root certificate on the client computing device. If the device is able to validate the certificate chain, then at an operation 324 the client computing device attempts to validate the signed diff file by, for example, using a public key of a last certificate on the now-validated certificate chain. If the diff file is validated, then the client computing device may install the diff file at an operation 326.

FIG. 4 illustrates that the application-update system 102 may utilize multiple certificate chains for signing the diff files described herein. Furthermore, each certificate chain may be associated with a time range during which the corresponding certificate chain is valid, with these time ranges overlapping one another avoid interruption of the application-update system 10. As illustrated, a first certificate chain 402 may be valid for a first time range during between T(1) and T(3), while a second certificate chain 404 may be valid during a second time range between T(2) and T(4). As illustrated, these time ranges may overlap during an overlapping portion 406 of the time times. The application-update system may use one or both these certificate chains to cryptographically sign diff files sent to a client computing device such that the client computing device is able to verify the authenticity of the diff file.

Figure 5:
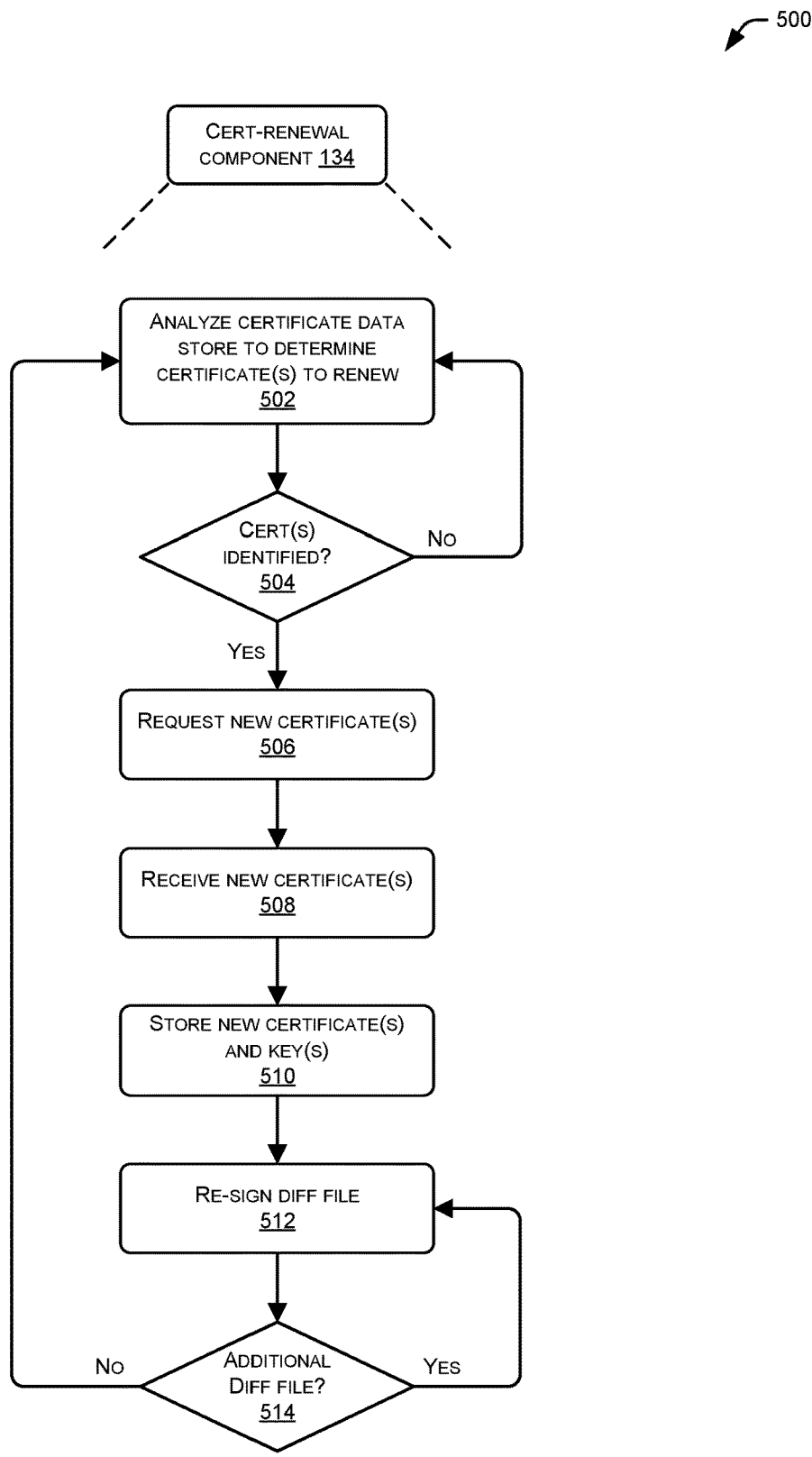
FIG. 5 illustrates a flow diagram of an example process that a cert-renewal component of the application-update system of FIG. 1 may implement for determining when to renew a certificate chain, such as one of the certificate chains illustrated in FIG. 4.

FIG. 5 illustrates a flow diagram of an example process 500 that a cert-renewal component 134 of the application-update system 102 may implement for determining when to renew a certificate chain, such as one of the certificate chains illustrated in FIG. 4. At an operation 502, the cert-renewal component 134 may analyze a certificate datastore to determine whether one or more certificates are to be renewed. For example, this operation may comprise the cert-renewal component 134 analyzing the certificate datastore 132 to determine whether any certificates are associated with an expiry time that is within a threshold amount of time. If not, then the process 500 continues to analyze the certificate datastore at the operation 502. If, however, a certificate is identified for renewal at an operation 504, then at an operation 506 the cert-renewal component 134 may request one or more new certificates and/or new certificate chains.

At an operation 508, the cert-renewal component 134 receives the new certificates and/or certificate chains and, at an operation 510, stores certificate and/or the key(s) (e.g., the private key and, potentially, the public key), such as in the certificate datastore 132. At an operation the cert-renewal component 134 instructs the signature component 130 to re-sign each diff file in the differential datastore 124. An operation 514 represents determining whether there are additional diff files to re-sign. If so, then the process 500 returns to the operation 512 for signing the diff file(s). If not, then the process 500 returns to the operation 502 for analyzing the certificate datastore.

Figure 6A:
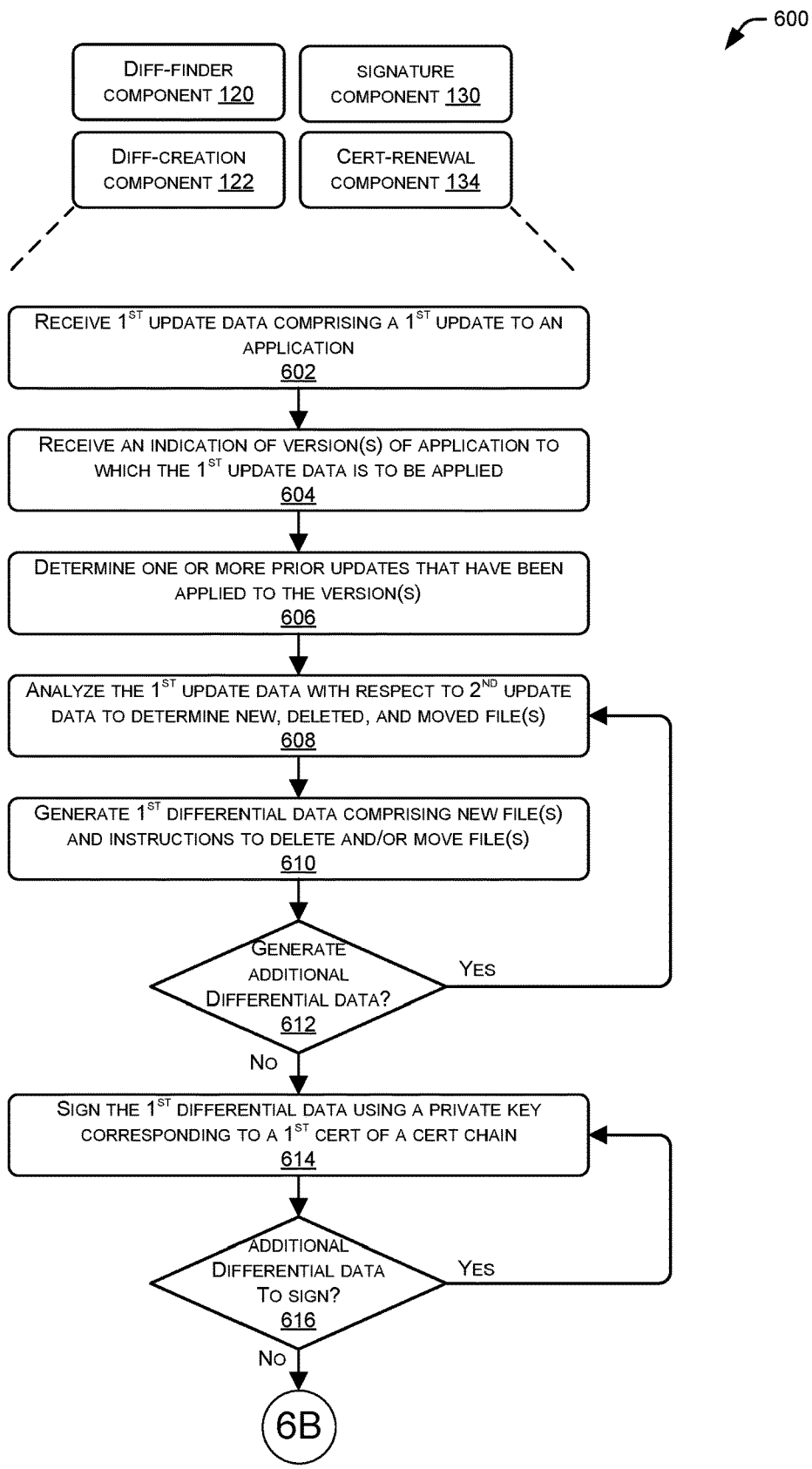
FIGS. 6A-B collectively illustrate a flow diagram of an example process that components of the application-update system may implement for accurately and efficiently updating applications stored client computing devices.
Figure 6B:
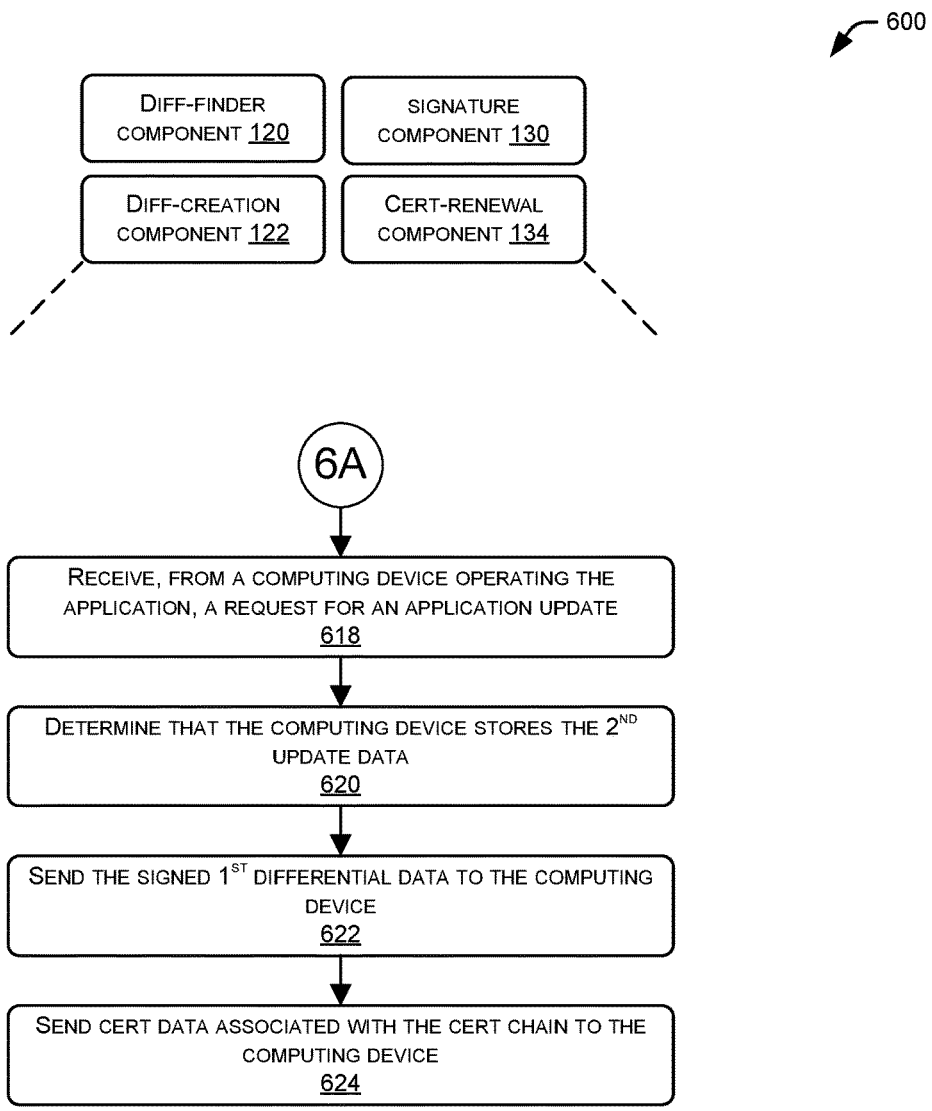

FIGS. 6A-B collectively illustrate a flow diagram of an example process 600 that components of the application-update system 102 may implement for accurately and efficiently updating applications stored client computing devices. In some instances, one or more of operations of the process 600 may be performed by the diff-finder component 120, the diff-creation component 122, the signature component 130, and/or the cert-renewal component 134.

An operation 602 represents receiving first update data comprising a first update to an application. For example, the application-update system 102 may receive, from an application developer, update data corresponding to a new update to an application for deployment to one or more client devices that store the application.

An operation 604 represents receiving an indication of at least one version of the application to which the first update data is to be applied. For example, the application developer may specify which one or more versions of the update that the first update data is to apply to and/or may specify one or more prior updates that the first update data is to apply to. In some instances, the indication comprises an indication of one or more particular versions of the application the update applies to, a range of versions that the update applies, a minimum version of the application the update applies to, a maximum version of the application the update applies to, and/or the like.

An operation 606 represents determining, based at least in part on the indication, one or more prior updates that have been previously applied to the at least one version of the application, the one or more prior updates including at least a second update associated with second update data. For example, if the indication received at the operation 604 indicates that the first update data applies to version five of an application, then the diff-finder component 120 may determine which updates have previously been applied to this particular version of the application. In this example, the diff-finder component 120 determines that this version has as least previously received second update data corresponding to a particular previously deployed update.

An operation 608 represents analyzing the first update data with respect to second update data associated with the application to determine at least a first file included in the first update data but not in the second update data and at least one of a second file included in the second update but not in the first update data or a third file that is present in the first update data at a first location and in the second update data in a second location. For example, the diff-creation component 122 may generate a hash value of each file in the first update data and compare this hash value to one or more hash values of files associated with the second update data (and/or other update data identified at the operation 606) to identify any files that are new (and/or duplicated) to the new update relatively to the previous update, any files that are deleted from the new update relative to the previous update, and/or any files that are in different locations in the new update relative to the previous update.

An operation 610 represents generating first differential data comprising at least the first file, a first instruction to delete the second file, and a second instruction to move the third file from the second location to the first location. For example, the diff-creation component 122 may generate the first differential data comprising any new files and transform data comprising instructions for generating the first update data using the second update data, and the new file(s). For example, the transform data may comprise instructions to delete any deleted files, move any moved files, duplicate any duplicated files (and store them in the new location(s)) and/or the like. In some instances, the first differential data may be free from any deleted and/or moved files, such that the first differential data includes only new files and instructions, resulting in the smallest package size.

An operation 612 represents determine whether there is additional differential data to generate. For example, if the example version five of the application has previously received three updates, then the diff-creation component 122 may proceed to generate the second (of three) differential data. In this instance, the differential data corresponds to differences between the first update data and, for example, third update data. In these instances where the diff-creation component 122 determines to generate additional differential data, the process 600 returns to the operation 608.

If the diff-creation component 122 determines that there is no additional differential data to generate, then the process 600 proceeds to an operation 614, which represents signing the first differential data using a private key corresponding a leaf certificate of a certificate chain to generate signed first differential data. The signed first differential data may then be stored in the datastore 124.

The process 600 then proceeds to an operation 616, which represents determining where there is additional differential data to sign. For instance, in the example above where the first update data has been determined to apply to three previous updates, the process may sign the additional two differential data and store these signed differential data in the datastore 124.

Upon signing each of the differential data, the process then proceeds to FIG. 6B, which includes, at an operation 618, receiving, from a computing device operating the application, a request for an update to the application. For example, a client computing device operating the example version five of the application may send a request for an update to the application-update system 102. In some instances, the request may include an indication of the version of the application being utilized by the client computing device (e.g., version five) and/or the update currently being utilized by the application (e.g., an update corresponding to the second update data, in this example).

An operation 620 represents determining that the computing device stores the second update data. For example, the application-update system 102 may determine, from the request from the client computing device, that the application executing on the client computing device is currently using the update corresponding to the second update data, for which the first differential data has been created.

An operation 622 represents sending the signed first differential data to a computing device that requests an update to the application, while an operation 624 represents sending, to the computing device, certificate data associated with the certificate chain to enable to computing device to verify the certificate chain and to verify a signature of the signed first differential data. For example, the application-update system 102 may send the signed first differential data to the client computing device, along with a URL for locating the certificate-chain for validating the signature of the differential data.

Figure 7:
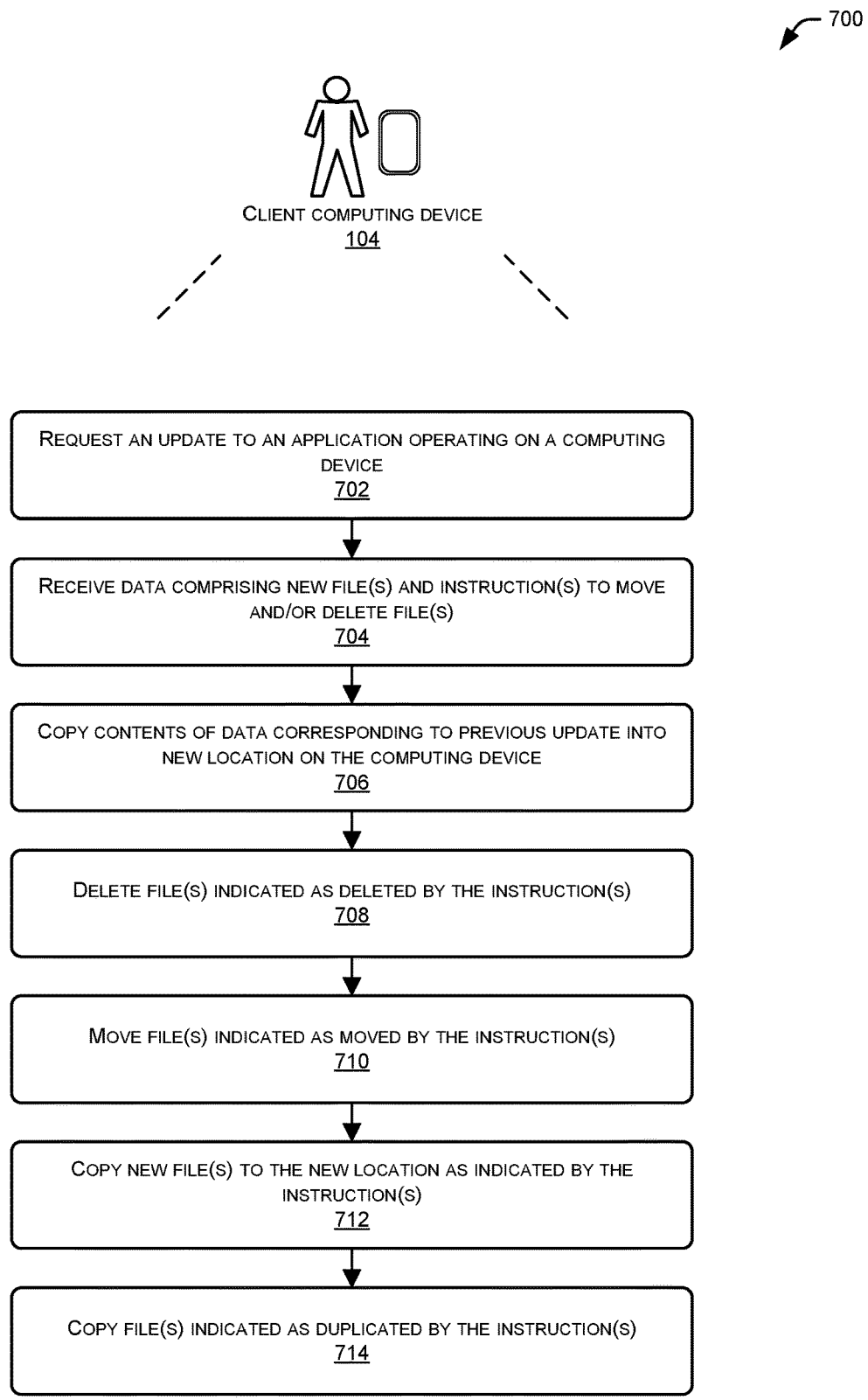
FIG. 7 illustrates a flow diagram of an example process that a client computing device may implement in response to receiving update data for updating an application stored on the client computing device.

FIG. 7 illustrates a flow diagram of an example process 700 that a client computing device may implement in response to receiving update data for updating an application stored on the client computing device. In some instances, the process 700 may be executed by a component stored in memory of the client computing device and having processor-executable instructions.

An operation 702 represents requesting an update to an application operating on the computing device. For example, the client computing device may be configured to send a request for an update to the application-update system periodically or in response to any other trigger. In some instances, this request includes, or is preceded or followed by, an indication of the version of the application and/or update of the application version that the client computing device is currently operating.

An operation 704 represents receiving data (e.g., a diff file) comprising one or more new files and one or more instructions for deleting and/or moving one or more files. For example, the data may comprise differential data that includes one or more new files and transform data comprising instructions for generating the new update using the update currently stored on the client computing device and the new file(s).

An operation 706 represents copying contents of data corresponding to the previous update to a new file location on the computing device. For example, the previously received update location is copied from a first location on the client computing device to a new location on the client computing device, such as a new folder where the new update will be generated.

An operation 708 represents deleting one or more files as indicated by the instructions. For example, the transform data may include instruction(s) to delete any files that were present in the previous update by not in the new update.

An operation 710 represents moving one or more files as indicated by the instructions. For example, the transform data may include instruction(s) to move any files from a previous location in the previous update to a new location in the new update.

An operation 712 represents copying the new files in the received data (e.g., the differential data) to the new file location in their appropriate locations. That is, after deleting the deleted files and moving the moved filed, the new files from the data received at the operation 704 may be copied into the new file location (from operation 706) at the location(s) indicated by the transform data.

Finally, an operation 714 represents copying one or more files indicated by the instructions as being duplicated files to their duplicated locations. For example, if the instruction(s) indicate that a new file is located at multiple locations, this operation may include generating duplicated copy of the new file and storing the duplicated copy in an additional location. After performing this operation, it is to be appreciated the new folder may correspond to the update data of the new update initially deployed by the application developer. That is, by using the previous update, the new file(s), and the transform data, the client computing device is able to recreate the new update while only downloading the new file(s) and the transform data.

The processes described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system for providing updates to an application, the system comprising:
   one or more processors; and
   one or more computer-readable media storing computer-executable instructions that, when executed, cause the one or more processors to perform acts comprising:
      receiving, from a developer of the application, first update data comprising a first update to the application;
      receiving, from the developer, an indication of a version of the application associated with the first update data;
      determining that the version of the application is associated with at least second update data previously provided to computing devices operating the version of the application and third update data previously provided to computing devices operating the version of the application;
      generating first differential data based at least in part on one or more differences between the first update data and the second update data;
      generating second differential data based at least in part on one or more differences between the first update data and the third update data;
      storing the first differential data;
      storing the second differential data;
      receiving, from a computing device operating the version of the application, a request for an update corresponding to the second update data;

signing the first differential data using a private key corresponding to a leaf certificate of a certificate chain to generate signed first differential data; and sending the signed first differential data to the computing device.

2. The system as recited in claim 1, wherein the one or more computer-readable media further store computer-executable instructions that, when executed, cause the one or more processors to perform acts comprising:

generating a hash value for each file of the first update data;

comparing each respective hash value for each file of the first update data to one or more hash values of respective files of the second update data;

determining, based at least in part on the comparing, at least one new file that is present in the first update data but not in the second update data;

determining, based at least in part on the comparing, at least one deleted file that is present in the second update data but not the first update data; and determining, based at least in part on the comparing, that at least one file has moved from a first directory location in the second update data to a second directory location in the first update data;

and wherein the generating the first differential data comprises generating first differential data including at least: (i) the new file, and (ii) instructions to delete the at least one deleted file and to move the at least one file from the first directory location to the second directory location.

3. The system as recited in claim 1, wherein the one or more computer-readable media further store computer-executable instructions that, when executed, cause the one or more processors to perform acts comprising:

sending, to the computing device, certificate data associated with the certificate chain to enable the computing device to verify the certificate chain and to verify a signature of the signed first differential data;

determining that the leaf certificate is associated with a first expiry time that is set to occur within a threshold amount of time;

generating, based at least in part on the determining that the first certificate chain is associated with the first expiry time that is set to occur within the threshold amount of time, a new certificate chain including a new leaf certificate; and associating the new certificate chain with a time range during which the new certificate chain is valid, the time range beginning prior to the first expiry time and ending at a second expiry time that is after the first expiry time.

4. A system comprising:

one or more processors; and one or more computer-readable media storing computer-executable instructions that, when executed, cause the one or more processors to perform acts comprising:

receiving first update data comprising a first update to an application;

analyzing the first update data with respect to second update data associated with the application to determine at least:

a first file included in the first update data but not in the second update data; and at least one of a second file included in the second update data but not in the first update data or a third file that is present in the first update data at a first location and in the second update data in a second location;

generating differential data comprising the first file and at least one of a first instruction to delete the second file or a second instruction to move the third file from the second location to the first location;

signing the differential data using a private key corresponding to a leaf certificate of a certificate chain to generate signed differential data; and sending the signed differential data to a computing device that requests an update to the application.

5. The system as recited in claim 4, wherein the one or more computer-readable media further store computer-executable instructions that, when executed, cause the one or more processors to perform acts comprising:

receiving an indication of at least one version of the application to which the first update data is to be applied;

determining, based at least in part on the indication, one or more prior updates that have been previously applied to the at least one version of the application, the one or more prior updates including at least a second update associated with the second update data; and generating respective differential data for each of the one or more prior updates.

6. The system as recited in claim 5, wherein the receiving the indication comprises receiving an indication of at least one of a specific version of the application, a range of versions of the application, or a minimum version of the application.

7. The system as recited in claim 4, wherein the one or more computer-readable media further store computer-executable instructions that, when executed, cause the one or more processors to perform acts comprising:

computing a first hash value of a particular file of the first update data;

and wherein the analyzing comprises analyzing the first hash value with respect to at least a second hash value of the second update data to determine at least one of whether the particular file is included in the first update data but not in the second update data, is included in the second update data but not in the first update data, is present in the first update data and in the second update data, or has a different location in the first update data than in the second update data.

8. The system as recited in claim 4, wherein:

the analyzing comprises analyzing the first update data with respect to the second update data to determine each file included in the first update data but not the second update data, each file included in the second update data but not in the first update data, and each file that is present in the first update data and the second update but in a different location; and the generating comprises generating the differential data comprising each file included in the first update data but not the second update data, instructions to delete each file that is included in the second update data but not the first update data and instructions to move each file that is present in the first update data and the second update data but in a different location.

9. The system as recited in claim 4, wherein the generating the differential data comprises generating the differential data free from any file that is present in both the first update data and the second update data.

10. The system as recited in claim 4, wherein the one or more computer-readable media further store computer-executable instructions that, when executed, cause the one or more processors to perform acts comprising:
  receiving, from a computing device operating the application, a request for an update to the application;
  determining that the computing device stores the second update data; and
  sending the differential data to the computing device.

11. The system as recited in claim 4, wherein the differential data is first differential data and the one or more computer-readable media further store computer-executable instructions that, when executed, cause the one or more processors to perform acts comprising:
  analyzing the first update data with respect to third update data associated with the application to determine at least:
    a fourth file included in the first update data but not in the third update data; and
    at least one of a fifth file included in the second update but not in the third update data or a sixth file that is present in the first update data at a third location and in the third update data in a fourth location; and
  generating second differential data comprising the fourth file and at least one of a third instruction to delete the fifth file or a fourth instruction to move the sixth file from the third location to the fourth location.

12. The system as recited in claim 4, wherein the one or more computer-readable media further store computer-executable instructions that, when executed, cause the one or more processors to perform acts comprising:
  sending, to the computing device, certificate data associated with the certificate chain to enable the computing device to verify the certificate chain and to verify a signature of the signed differential data;
  determining that the leaf certificate is associated with a first expiry time that is set to occur within a threshold amount of time;
  generating, based at least in part on the determining that the first certificate chain is associated with the first expiry time that is set to occur within the threshold amount of time, a new certificate chain including a new leaf certificate; and
  associating the new certificate chain with a time range during which the new certificate chain is valid, the time range beginning prior to the first expiry time and ending at a second expiry time that is after the first expiry time.

13. The system as recited in claim 4, wherein the generating further comprises generating the differential data comprising a third instruction to duplicate first file to generate a duplicated first file and store the duplicated first file at a new location.

14. A method comprising:
  receiving first update data comprising a first update to an application;
  analyzing the first update data with respect to second update data associated with the application to determine at least:
    a first file included in the first update data but not in the second update data; and
    at least one of a second file included in the second update but not in the first update data or a third file that is present in the first update data at a first location and in the second update data in a second location;
  generating differential data comprising the first file and at least one of a first instruction to delete the second file or a second instruction to move the third file from the second location to the first location;
  signing the differential data using a private key corresponding to a leaf certificate of a certificate chain to generate signed differential data; and
  sending the signed differential data to a computing device that requests an update to the application.

15. The method as recited in claim 14, further comprising:
  receiving an indication of at least one version of the application to which the first update data is to be applied;
  determining, based at least in part on the indication, one or more prior updates that have been previously applied to the at least one version of the application, the one or more prior updates including at least a second update associated with the second update data; and
  generating respective differential data for each of the one or more prior updates.

16. The method as recited in claim 15, wherein the receiving the indication comprises receiving an indication of at least one of a specific version of the application, a range of versions of the application, or a minimum version of the application.

17. The method as recited in claim 14, further comprising:
  computing a first hash value of a particular file of the first update data;
  and wherein the analyzing comprises analyzing the first hash value with respect to at least a second hash value of the second update data to determine at least one of whether the particular file is included in the first update data but not in the second update data, is included in the second update data but not in the first update data, is present in the first update data and in the second update data, or has a different location in the first update data than in the second update data.

18. The method as recited in claim 14, wherein:
  the analyzing comprises analyzing the first update data with respect to the second update data to determine each file included in the first update data but not the second update data, each file included in the second update data but not in the first update data, and each file that is present in the first update data and the second update but in a different location; and
  the generating comprises generating the differential data comprising each file included in the first update data but not the second update data, instructions to delete each file that is included in the second update data but not the first update data and instructions to move each file that is present in the first update data and the second update data but in a different location.

19. The method as recited in claim 14, wherein the generating the differential data comprises generating the differential data free from any file that is present in both the first update data and the second update data.

20. The method as recited in claim 14, further comprising:
  receiving, from a computing device operating the application, a request for an update to the application;
  determining that the computing device stores the second update data; and
  sending the differential data to the computing device.

21. The method as recited in claim 14, wherein the differential data is first differential data, the method further comprising:
  analyzing the first update data with respect to third update data associated with the application to determine at least:

a fourth file included in the first update data but not in the third update data; and at least one of a fifth file included in the second update but not in the third update data or a sixth file that is present in the first update data at a third location and in the third update data in a fourth location; and generating second differential data comprising the fourth file and at least one of a third instruction to delete the fifth file or a fourth instruction to move the sixth file from the third location to the fourth location.

22. The method as recited in claim 14, further comprising:

sending, to the computing device, certificate data associated with the certificate chain to enable the computing device to verify the certificate chain and to verify a signature of the signed differential data;

determining that the leaf certificate is associated with a first expiry time that is set to occur within a threshold amount of time;

generating, based at least in part on the determining that the first certificate chain is associated with the first expiry time that is set to occur within the threshold amount of time, a new certificate chain including a new leaf certificate; and associating the new certificate chain with a time range during which the new certificate chain is valid, the time range beginning prior to the first expiry time and ending at a second expiry time that is after the first expiry time.

* * * * *